United States Patent
Wallenius et al.

(10) Patent No.: US 6,852,197 B2
(45) Date of Patent: Feb. 8, 2005

(54) WET STRONG TISSUE PAPER

(75) Inventors: Hans Wallenius, Ljungskile (SE); Sussan Sandberg, Onsala (SE); Marek Gorzynski, Düren (DE); Oliver Struck, Duren (DE)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 10/201,011

(22) Filed: Jul. 22, 2002

(65) Prior Publication Data

US 2003/0024667 A1 Feb. 6, 2003

Related U.S. Application Data

(63) Continuation of application No. 09/861,444, filed on May 18, 2001, now abandoned, which is a continuation-in-part of application No. 09/713,166, filed on Nov. 15, 2000.
(60) Provisional application No. 60/166,564, filed on Nov. 19, 1999.

(51) Int. Cl.[7] .......................... D21H 21/20; D21H 17/55
(52) U.S. Cl. ................. 162/164.6; 162/168.2; 162/158; 162/109
(58) Field of Search .............. 162/164–164.3, 162/164.4, 168.1, 168.3, 158, 175, 109, 164.6

(56) References Cited

U.S. PATENT DOCUMENTS

| | | | |
|---|---|---|---|
| 3,607,622 A | | 9/1971 | Espy ........................... 162/167 |
| 3,700,623 A | | 10/1972 | Keim ...................... 260/80.3 R |
| 3,772,076 A | | 11/1973 | Keim ...................... 117/155 R |
| 3,922,243 A | | 11/1975 | Aldrich et al. ......... 260/29.2 EP |
| 3,923,745 A | * | 12/1975 | Dumas ......................... 525/131 |
| 3,968,317 A | * | 7/1976 | Dumas ......................... 428/514 |
| 3,992,345 A | * | 11/1976 | Dumas ......................... 524/612 |
| 4,416,729 A | | 11/1983 | Killat et al. .............. 162/164.3 |
| 5,200,036 A | | 4/1993 | Noda ....................... 162/164.3 |
| 5,227,023 A | * | 7/1993 | Pounder et al. ............. 162/101 |
| 5,314,721 A | | 5/1994 | Müller et al. ................ 427/386 |
| 5,677,384 A | | 10/1997 | Detering et al. ............. 525/281 |
| 5,698,688 A | * | 12/1997 | Smith et al. ................... 536/56 |
| 5,714,552 A | | 2/1998 | Bower ......................... 525/420 |
| 5,865,824 A | * | 2/1999 | Chen et al. .................. 604/378 |
| 5,955,567 A | | 9/1999 | Bigorra Llosas et al. ... 528/310 |
| 6,017,417 A | * | 1/2000 | Wendt et al. ................ 162/109 |
| 6,017,418 A | * | 1/2000 | Oriaran et al. .............. 162/111 |
| 6,027,611 A | * | 2/2000 | McFarland et al. ......... 162/127 |
| 6,033,523 A | * | 3/2000 | Dwiggins et al. ........... 162/111 |
| 6,033,761 A | * | 3/2000 | Dwiggins et al. ........... 418/172 |
| 6,077,393 A | * | 6/2000 | Shannon et al. ............ 162/158 |
| 6,228,216 B1 | * | 5/2001 | Lindsay et al. ............. 162/111 |
| 6,238,519 B1 | * | 5/2001 | Jones et al. ................. 162/123 |
| 6,294,645 B1 | * | 9/2001 | Allen et al. ............... 528/339.3 |
| 6,332,952 B1 | * | 12/2001 | Hsu et al. ................... 162/127 |
| 6,702,923 B1 | * | 3/2004 | Gorzynski et al. ....... 162/164.6 |
| 2003/0024667 A1 | * | 2/2003 | Wallenius et al. .......... 162/109 |

FOREIGN PATENT DOCUMENTS

| | | | | |
|---|---|---|---|---|
| EP | 66366 A2 | * | 12/1982 | .......... C08G/69/48 |
| EP | 510 987 A1 | | 10/1992 | .......... C08G/69/48 |
| EP | 666 242 A1 | | 8/1995 | .......... C02F/1/469 |
| EP | 802 215 A1 | | 10/1997 | .......... C08G/73/02 |
| WO | WO 92/22601 | | 12/1992 | .......... C08G/65/30 |
| WO | WO 95/01478 | | 1/1995 | .......... D21H/17/07 |
| WO | WO 95/27008 | | 10/1995 | .......... C08L/63/00 |
| WO | WO 98/39376 | | 9/1998 | .......... C08G/73/02 |
| WO | WO 99/34059 | | 7/1999 | .......... D21H/21/20 |
| WO | WO 01/36491 A1 | | 5/2001 | |

OTHER PUBLICATIONS

International Search Report of International Application No. SE 01/00670, dated Feb. 27, 2002.

* cited by examiner

*Primary Examiner*—José A. Fortuna
(74) *Attorney, Agent, or Firm*—Michelle J. Burks; Lainie E. Parker

(57) ABSTRACT

Tissue paper having a bulk between 2 and 8 $cm^3/g$ and containing an amount of a wet strength agent, wherein the tissue paper contains a wet strength agent in the form of a nitrogen-containing polymer having hydrophobic sidechains. Said tissue paper before converting has a relative wet strength value (RWS) of at least 45%.

13 Claims, No Drawings

WET STRONG TISSUE PAPER

This application is a continuation of application Ser. No. 09/861,444, filed May 18, 2001 now abandoned, which is a continuation-in-part of application Ser. No. 09/713,166, filed Nov. 15, 2000 now U.S. Pat. No. 6,702,923, which claims priority based on US Provisional Application No. 60/166,564, filed Nov. 19, 1999, and EP 99850174.6, filed Nov. 19, 1999.

The invention relates to a tissue paper having a bulk between 2 and 8 $cm^3/g$, said tissue paper containing an amount of a wet strength agent and having a wet strength index of at least 1 Nm/g.

BACKGROUND

In the papermaking art, wet strength agents like epichlorohydrin-based resins, for example polyaminoamide epichlorohydrin resins have been used for a long time to enhance the strength of paper. Such resins are disclosed in U.S. Pat. Nos. 3,700,623 and 3,772,076. The wet strength of a paper relates to its ability to maintain physical integrity and to resist tearing, bursting, and shredding under use, especially under wet conditions. A further important property of wet strengthened paper is the softness, especially for tissue paper or the like. The softness can be described as the tactile sensation perceived when holding or rubbing a paper across the skin. U.S. Pat. No. 5,200,036 discloses a wet strength agent which provides paper with enhanced wet strength. A cationic polyaminoamide epichlorohydrin resin is modified by introduction of a polymerisable unsaturated hydrocarbon moiety thus providing it with ethylenically unsaturated side-chain substituents. The resin is then added to latex-forming monomers whereby co-polymerisation occurs forming bonds between unsaturated polymerisable hydrocarbon moieties of the resin and the latex-forming monomers. The reaction may be assisted by addition of an emulsifier to obtain a desirable suspension of the formed latex panicles. Resins of the above-mentioned types are also used as emulsifiers. Usually, the resins are not effective enough when used as a sole emulsifier and these are thus used in combination with an additional compound.

U.S. Pat. No. 5,314,721 discloses a process for preparation of vinyl polymer dispersions comprising resin based on a cationic polyaminoamide whose terminal groups have been substituted with long-chain aliphatic hydrocarbon radicals which have at least 7 carbon atoms and are derived from monocarboxylic acids. The product obtained is used as a sizing agent.

U.S. Pat. No. 4,416,729 discloses a method for preparing wet strength additives comprising the steps of contacting a linear polyamidoamine with an α,β-ethylenically unsaturated carboxylic compound to form a substituted polyamidoamine, contacting the substituted polyamidoamine with a polyamine to form a branched polyamidoamine bearing a pendant amine moiety, and contacting the branched polyamidoamine with an epihalohydrin to form pendant curable ammonium moieties on the branched polyamidoamine. U.S. Pat. No. 4,416,729 does not disclose use of the prepared wet strength additives for production of tissue paper.

Although the above epichlorohydrin-based resins in some applications show adequate wet strength and emulsifying properties, it would be desirable to be able to provide further and improved wet strength agents for paper and methods for providing such agents. It would also be desirable to be able to provide wet strength resins and agents exhibiting improved softness properties. Further, it would be desirable to be able to provide further resins having improved emulsifying properties.

THE INVENTION

According to the present invention, it has been found that further and improved wet strength agents for paper can be obtained by a composition containing polymeric particles and hydrophobic hydrocarbon groups providing side-chain substituents on wet strength resins. It has also been found a new method for the production of such wet strength resins and agents. It has further been discovered that the wet strength agents and resins produced by the method according to the present invention give paper improved softness properties without negatively affecting the absorbency properties.

More specifically, the invention relates to paper wet strength agents comprising polymeric particles and wet strength resins comprising a cationic nitrogen-containing polymer having hydrophobic side-chain substituent. The invention further relates to a method for the production of a paper wet strength agent comprising a first step of reacting a nitrogen-containing polymer with a hydrophobic compound to provide a nitrogen-containing polymer with hydrophobic side-chain substituents, a second stop of reacting the product obtained with a crosslinker to form a cationic wet strength resin and a third step comprising emulsion polymerisation of one or more ethylenically unsaturated monomers in the presence of the wet strength resin formed. Further, the invention relates to a paper wet strength agent obtainable from the method above. The invention further relates to a new wet strength resin and a method for preparing a wet strength resin according to the two first steps as described herein. The invention also relates to the production of paper comprising addition of a paper wet strength resin or agent to a cellulosic suspension and to the use of a paper wet strength resin or agent for the production of paper. The invention also relates to paper comprising paper wet strength resins and agents. The invention is further defined in the appended claims.

The present invention provides resins and agents having the ability to impart improved wet strength properties to paper. The invention further provides a simple, convenient and effective synthetic route for the preparation of wet strength resins and agents. Thereby, the wet strength resins and agents of this invention can be prepared in high yield.

The present invention also provides wet strength resins and agents which make it possible to produce paper having enhanced softness properties. The softness of a paper sheet can be estimated by means of the relative wet strength value, which is defined as the ratio between the wet tensile index and the dry tensile index according to the formula RWS (in %)=(WS/DS)·100 where RWS stands for the relative wet strength, WS is the wet tensile index and DS is the dry tensile index of a paper. RWS is hence a measure of the softness of a paper; the higher the RWS, the higher the softness of the paper. The present wet strength resins and agents also provide improved emulsifying properties and can be used as sole emulsifiers without additional compounds which may give rise to undesirable foam formation.

The term "wet strength agent", as used herein, refers to an agent capable of imparting better wet strength properties to paper compared to paper containing no such agent. The wet strength agent comprises a wet strength resin. The term "wet strength resin", as used herein, refers to a resin capable of imparting better wet strength properties to paper compared to paper containing no such resin.

The method for the production of a paper wet strength agent comprises a first step of reacting a nitrogen-containing polymer with a hydrophobic compound to provide a nitrogen-containing polymer with hydrophobic side-chain substituents, a second step of reacting the product obtained with a crosslinker to form a wet strength resin, and a third step comprising forming of particles by emulsion polymerisation of one or more ethylenically unsaturated monomers in the presence of the wet strength resin formed. According to a preferred embodiment, no polyamine having at least 2 secondary and/or primary amino moieties, added between the first and the second step, or after the second step, is reacted.

Suitably, the nitrogen-containing polymer is a polyaminoamide, a polyamine or other nitrogen-containing polymer. Preferably, a polyaminoamide is used which may constitute the reaction product of a polycarboxylic acid, suitably a dicarboxylic acid, and a polyamine. By the term "carboxylic acid" is meant to include carboxylic derivatives such as anhydrides and esters. Suitable polycarboxylic acid include saturated or unsaturated allphatic or aromatic dicarboxylic acids. Preferably, the polycarboxylic acids contain less than 10 carbon atoms. Suitable polycarboxylic acids include oxalic acid, malonic acid, succinic acid, glutaric acid, adipic acid, azelaic acid, sebacic acid and derivatives thereof. Mixtures of these compounds can also be applied. Suitable polyamines include polyalkylene polyamine, e.g. diethylenetriamine, triethylenetetramine, tetraethylenepentamine, dipropylenetriamine and the like or mixtures thereof. Further, any polyaminoamide prepared according to a method disclosed in EP 802 215 A1, hereby incorporated by reference, may be used. Suitably, the molecular weight of the nitrogen-containing compound ranges from 100 to 50000, preferably 500 to 10000. Suitably, the polyamine to polycarboxylic acid ratio is 0.49:1 to 1.49:1, preferably less than 1.3:1, e.g. 1.3:1 to 0.7:1. Suitably, diethylenetriamine and adipic acid are reacted to form a polyaminoamide.

Suitably, the hydrophobic compounds used can contain groups of carboxylates or derivatives thereof. The hydrophobation reaction between the nitrogen-containing polymer and the hydrophobic compound can be performed via alkylation, vinylog addition or other reaction. The vinylog addition may be illustrated by the following schematic reaction:

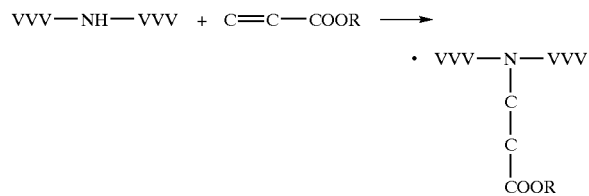

wherein VVV—NH—VVV represents a section of the nitrogen-containing polymer, C=C—COOR represents a hydrophobic compound containing a vinyl group. The vinyl group, i.e. the C=C group, of the hydrophobic compound can react with the nitrogen atoms of the polymer, R stands for a hydrophobic group of the hydrophobic compound which may be an alkyl, alkenyl, aryl, cycloalkyl or cycloalkenyl group. In case the vinylog reaction is applicable, the unsaturation of the vinyl group of the hydrophobic compound is turned saturated after having reacted with a nitrogen atom of the polymer.

According to one preferred embodiment, the hydrophobic compound is a saturated compound, or an unsaturated compound, resulting in a nitrogen-containing polymer having saturated or unsaturated side-chain substituents. The hydrophobic compounds can contain a hydrophobic group containing up to 40 carbons, preferably 6–40 carbons, and most preferably 8–40 carbons.

The hydrophobic chains of the hydrophobic compounds can be attached to the nitrogen-containing polymer via a chain of atoms, which can contain at least one hetero atom, via a covalent bond.

The hydrophobic compound may be selected from (meth)acrylates, alkenyl(meth)acrylate, alkyl(meth)acrylamides, esters, ethers, diazo compounds, carboxylic acids, acid anhydrides epoxides, alkyl sulphonates, alkyl sulphates and mixtures or derivatives thereof containing a hydrophobic group, preferably from alkyl(meth)acrylates, alkyl(meth)acrylamides, alkyl sulphonates, alkyl sulphates, diazo compounds, ethers, or epoxides or mixtures thereof, and most preferably from alkyl(meth)acrylates, alkyl(meth)acrylamides or mixtures thereof. Examples suitably include α,β-unsaturated esters or amides like lauryl acrylate, 2-ethylhexyl acrylate, dodecyl acrylate, N-alkyl(metha)acrylamides, N-alkylaminoalkyl(meth)acrylamides, N,N-dialkylaminoalkyl(meth)acrylamides, N-alkylaminoalkyl(meth)acrylates, N,N-dialkylaminoalkyl(meth)acrylates, hexyl chloride, 2-ethylhexyl chloride, octyl chloride, decyl chloride, dodecyl chloride, hexadecyl chloride, octadecyl chloride, ethyl epoxide, propyl epoxide, (n-, t-, 1-) butyl epoxides, pentyl epoxide, hexyl epoxide, 2-ethyl-hexyl epoxide, octyl epoxide, decyl epoxide, dodecyl epoxide, hexadecyl epoxide, octadecyl epoxide, hexene, 2-ethylhexyene, octene, decene, dodecene, hexadecene, and octadecene.

The reaction is suitably carried out in water, neat or in other solvent, e.g. in an organic solvent, e.g. methanol, ethanol, ethylene glycol or the like, capable of at least partly dissolving the reactants without taking part in the reaction under the reaction conditions. Mixture of such solvents can also be used. The reaction is preferably carried out in water. The molar ratio nitrogen-containing polymer (based on amino mols) to hydrophobic compound can be at least 1:1, suitably 2:1 to 99:1, preferably 3:1 to 40:1. The reaction temperature may range from about 25° C. to about 150° C., preferably from about 60 to about 90°C.

In a second step, the hydrophobised nitrogen-containing polymers are reacted with a crosslinker. The term crosslinker or crosslinking agent, as used herein, is meant to denote a compound having the ability to crosslink the resin and/or to form bonds to cellulosic fibres. Suitably, the crosslinkers, sometimes referred to as Intralinkers in EP 802 215 A1, describing various intralinkers, hereby incorporated by reference, can comprise epihalohydrins e.g. epichlorohydrin; diepoxides, diacrylates, dimethacrylates, diacrylamides, and dimethacrylamides and mixtures or derivatives thereof are used. Preferably, epichlorohydrin is used as crosslinker.

The reaction is suitably carried out in an aqueous solution, heat or by use of other solvent than water, e.g. ethanol, propanol or the like or mixtures thereof. Suitably, the solvent can not react with the reactants under the reaction conditions used. Preferably, the reaction is carried out in water. The reaction temperature may range from about 0° C. to about 150° C., preferably between from about 4 to about 80° C. The molar ratio of the hydrophobised nitrogen-containing polymer (based on amino-mols) to crosslinker in the reactant composition may be 10:1 to 1:10, preferably 2:1 to 1:2. In a third step according to the invention, the method comprises emulsion polymerisation of one or more ethylenically unsaturated monomers in the presence of the wet strength resin as formed after the second step herein. The monomers may be selected from styrene, butadiene, vinyl acetate, vinyl amide, alkyl(meth)acrylamide, alkyl(meth)acrylate, e.g. methyl (meth)acrylate, butyl (meth)acrylate, butyl glycidyl(meth) acrylate, 2-ethylhexyl(meth)acrylate, dodecyl(meth) acrylate, octadecyl(meth)acrylate; (meth)acrylonitrile, isoprene, or 1,6-hexandiol diacrylate, or mixtures or derivatives thereof. As a result of the polymerisation process, the formed wet strength resin can be anchored to the polymeric particles formed yielding a wet strength agent. As initiator of the polymerisation reaction, any conventional initiator can be used. For example, Wako VA 044 can be used. Preferably, the initiator is water soluble. In the emulsion polymerisation reaction, the wet strength resin works as an emulsifier during the particle formation. The formed particle maybe composed of one sole or a mixture of unsaturated ethylenically polymerisable monomers as above exemplified. The reaction is preferably carried out in water, organic solvents, e.g. ethanol, propanol or the like, or mixtures of organic solvents or mixtures of both water and organic solvents. The reaction temperature may range from 4° C. to about 150° C., preferably from about 30 to about 90° C. The weight ratio resin to monomer can be 100:1 to 1:100, suitably 10:1 to 1:50.

The invention further relates to a method for preparing a wet strength resin comprising the first and second steps of the method as above described.

The invention also relates to a wet strength agent comprising polymeric particles and a wet strength resin comprising a cationic nitrogen-containing polymer having saturated or unsaturated hydrophobic side-chain substituents and a derivative of a crosslinker.

The polymeric particles can be formed from polymerised monomers as described above. Preferably, monomers are selected from styrene, acrylates and mixtures or derivatives thereof.

The cationic nitrogen-containing polymer has saturated or unsaturated hydrophobic side-chain substituents and derivatives of a crosslinker attached to the nitrogen atoms of the polymer.

Examples of suitable nitrogen-containing polymers include well-known available commercial products which may be prepared as described above or according to conventional methods known in the art. Examples of suitable nitrogen-containing polymers include polyaminoamides alkyl polyamines, polyamines, and polyvinylamines.

Hydrophobic saturated or unsaturated side-chain substituents are attached to the nitrogen atoms of the nitrogen-containing polymer. The term hydrophobic side-chain substituent is here meant to include hydrophobic groups containing e.g. hydrophobic linear or branched hydrocarbon chains which can be linked, e.g. via a hetero atom by a covalent bond, to a nitrogen atom of the nitrogen-containing polymer. Hydrophobic groups may also include cyclic chains including cyclic hydrocarbons. Combinations of linear, branched and cyclic hydrocarbons are also included in the concept of hydrophobic groups.

The hydrophobic group of the hydrophobic side-chain can contain up to 40 carbon atoms, preferably 6–40 carbon atoms, and most preferably 8–40 carbon atoms.

The hydrophobic side-chain substituents may derive from e.g. alkyl(meth)acrylates, alkyl(meth)acrylamides, esters, ethers, diazo compounds, carboxylic acids, acid anhydrides, epoxides, alkyl sulphonates, or alkyl sulphates, or mixtures thereof containing a hydrophobic group, preferably from alkyl(meth)acrylates, alkyl(meth)acrylamides, alkyl sulphonates, alkyl sulphates, diazo compounds, ethers, or epoxides or mixtures thereof, and most preferably from alkyl(meth)acrylates, alkyl(meth)acrylamides or mixtures thereof.

Specific examples include substituent derived from $\alpha,\beta$-unsaturated esters or amides like lauryl acrylate, 2-ethylhexyl acrylate, dodecyl acrylate, N-alkyl(metha) acrylamides, N-alkylaminoalkyl(meth)acrylamide, N, N-dialkylaminoalkyl(meth)acrylamides, N-alkylaminoalkyl (meth)acrylates, N,N-dialkylaminoalkyl(meth)acrylates, alkyl sulphonate, alkyl sulphates, hexyl chloride, 2-ethylhexyl chloride, octyl chloride, decyl chloride, dodecyl chloride, hexadecyl chloride, octadecyl chloride, ethyl epoxide, propyl epoxide, (n-, t-, l-) butyl epoxide, pentyl epoxide, hexyl epoxide, 2-ethylhexyl epoxide, octyl epoxide, decyl epoxide, dodecyl epoxide, hexadecyl epoxide, octadecyl epoxide, hexene, 2-ethyl-hexylene, octene, decene, dodecene, hexadecene, and octadecene.

Other suitable substituents may derive from substituted succinic anhydrides containing a group selected from alkyl, alkenyl, aralkyl, or aralkenyl, and ketene dimers or multimers. Further examples of suitable substituents may be derived from the compounds disclosed in WO98/39376, hereby incorporated by reference.

A derivative of a crosslinker can be attached to the nitrogen-containing polymer which makes it possible to create bonds to nitrogen-containing polymers and/or cellulosic fibres. Derivatives of a crosslinker can be derived from epihalohydrins e.g. epichlorohydrin, diepoxides, diacrylates, dimethacrylates, diacrylamides, and dimethacrylamides or mixtures or derivatives thereof may be used. Preferably, the crosslinker is derived from epichlorohydrin.

According to one preferred embodiment, the cationic nitrogen-containing polymer is either a polyaminoamide-epichlorohydrin resin or a polyamine-epichlorohydrin resin having saturated hydrophobic side-chains. Suitably, at least 10% and preferably up to about 100% of the nitrogen atoms of the cationic resin comprise cationic groups. Suitably, up to 100% of the nitrogen atoms of the resin comprise hydrophobic groups, preferably up to 50%, most preferably 5–30%. Suitably, the wet strength agent comprises a composition of polymeric particles and a wet strength resin dissolved in a solvent, preferably the wet strength agent comprise an aqueous composition. Suitably, the aqueous composition has a solid content of 5–50 weight percent.

The invention further relates to a wet strength resin as above described.

The invention also relates to the use of the paper wet strength resin and agent, as described above for the production of paper, preferably tissue paper. The use comprises addition of the resin or agent to an aqueous suspension containing cellulosic fibres. The amount of resin added to dry cellulosic fibres may be in any proportions, suitably 1–70, preferably 5–50, more preferably 15–50, and most preferably 25–50 kg/tonne dry cellulosic fibres. The grammage of the produced paper suitably is lower than about 70 $g/m^2$, preferably lower than about 60 $g/m^2$, and most preferably lower than 40 $g/m^2$. The paper wet strength resin and agent are preferably produced as aqueous dispersions which comprise the resin, water and optionally emulsified particles. The dispersion can then be added to an aqueous cellulosic suspension to treat paper-forming cellulosic fibres. The paper wet strength resin and agent may also be added to the produced paper and thus providing surface treatment of the paper. Further, the addition of the wet strength resin or agent may be added together with any other chemical known in the art conventionally used in the production of paper, e.g. sizing agents, softeners, retention aids, dewatering agents, dry strength agents, charge control agents or any other conventional chemicals, e.g. guars, carboxymethyl cellulose, polyacrylamide, polystyrene. Further, conventional fillers can be added thereto, e.g. clay, calcium carbonate, titanium dioxide, talc, aluminium silicate, calcium sulphate, calcium silicate or others described in WO 97/37080. Further, the wet strength agent may be added to the cellulosic fibre-containing suspension in any proportion. Before the wet strength resin or agent are added to an aqueous cellulosic suspension, the aqueous dispersion containing the resin or agent may be subjected to removal of toxic by-products by means of ion exchange, electrodialysis, enzymatical treatment, filtration, steam stripping or the like in order hot to add any toxic products, e.g. chloropropandiol, dichloropropanol to the cellulosic suspension. These methods are further described in for example EP 666 242 A1, EP 510 987 A1 and WO 92/22601.

The invention further relates to a process for the production of paper, preferably tissue paper, comprising addition of a paper wet strength resin and/or an agent as described and exemplified herein to an aqueous cellulosic suspension. The invention also relates to paper, preferably tissue paper, comprising a wet strength resin and/or an agent as described and exemplified herein. By tissue paper is generally meant items such as facial, hand, and toilet tissues used as a personal care product which comprises two key elements: a substrate formed of a planar material commonly known as tissue paper and an emollient which is carried by the substrate. In this context, tissue paper also comprises applications for domestic and industrial use, such as wiping of objects by means of kitchen rolls or the like. Tissue paper is generally produced from an aqueous suspension of cellulosic fibres, to which suspension wet strength agents have been added. The cellulose fibre-containing aqueous suspension is thereafter dewatered, suitably to a consistency of between about 7% and 25% water, suitably by means of vacuum dewatering and pressing operations such as opposing mechanical members, e.g. cylindrical rolls, to obtain a wet cellulose fibre-containing web. The dewatered web is further pressed during transfer and dried suitably by a stream drum apparatus known in the art as a Yankee dryer. Vaccum may also be applied to the web as well as multiple Yankee dryer drums, whereby additional pressing is optionally incurred between the drums, thereby forming tissue paper structures. The substrate can either consist of a single ply of tissue paper or it can comprise a laminate of two or more plies of tissue paper. In either event, since the substrate is formed of tissue paper, it is contemplated that it will be relatively thin in comparison to its dimensions in its major plane. As a relatively thin planar material, the substrate will have two major surfaced. Four important physical attributes of tissue papers are their strength, their softness, their absorbency, particularly for aqueous systems, and their lint resistance, particularly their lint resistance when wet, as further described in WO95/01478. Production methods for producing tissue paper are further described in WO95/01478, hereby incorporated by reference. More specific applications or uses of tissue paper include receiving and containing discharges from the human body, which can be used to wipe portions of the human body to remove substances therefrom, and which can be used to deposit materials thereon. The inventional paper wet strength resin or agent suitably has hydrophobic side-chains containing 6–40 carbon atoms, preferably 8–40 carbon atoms. Hydrophobic side-chains may be derived from (meth)acrylates, alkenyl(meth) acrylate, alkyl(meth)acrylamides, esters, ethers, diazo compounds, carboxylic acids, acid anhydrides, epoxides, alkyl sulphonates, alkyl sulphates and mixtures or derivatives thereof containing a hydrophobic group, preferably from alkyl(meth)acrylates, alkyl(meth)acrylamides, alkyl sulphonates, alkyl sulphates, diazo compounds, ethers, or epoxides or mixtures thereof, and most preferably from alkyl(meth)acrylates, alkyl(meth)acrylamides or mixtures thereof. Other suitable hydrophobic side-chains may be derived from substituted succinic anhydrides containing a group selected from alkyl, alkenyl, aralkyl, or aralkenyl, and ketone dimers or multimers. Further examples of suitable hydrophobic side-chains may be derived from the hydrophobic compounds disclosed in e.g. WO98/39376, U.S. Pat. No. 9,922,243, hereby incorporated by reference. The grammage of the produced tissue paper suitably is lower than about 70 $g/m^2$, preferably lower than about 60 $g/m^2$, and most preferably lower than 40 $g/m^2$. The amount of resin or agent added to a certain amount of dry cellulosic fibres may be in any proportions, suitably from about 1 to about 70 kg/tonne dry cellulosic fibres, preferably from about 5 to about 50, more preferably from about 15 to about 50, and most preferably from about 25 to about 50 kg/tonne dry cellulosic fibres. According to one preferred embodiment, a further dry strength agent is added in combination with the inventional paper wet strength resin or agent, e.g. starch, guar, carboxymethylcellulose (CMC) or a synthetic dry strength agent such as anionic or amphoteric polyacrylamides, even though the addition level of the inventional paper wet strength resin or agent to the aqueous cellulosic suspension is from about 5 to about 50 kg/tonne dry cellulosic fibres. In order to adjust a suitable dry strength of the produced tissue paper, a person skilled in the art can select a suitable hydrophobic wet strength resin or agent to obtain a desirable tissue paper, whereas the wet strength of the tissue paper can be controlled by adding an appropriate amount of resin or agent to the aqueous suspension. A tissue paper having a high relative wet strength can thereby easily be achieved.

The invention further refers to a tissue paper containing a wet strength agent in the form of a nitrogen-containing polymer having hydrophobic side-chain substituents as disclosed above and which tissue paper before converting has a relative wet strength value (RWS) of at least 45%.

The relative wet strength value (RWS) is defined as: RWS (%)=WS/DS wherein WS=wet strength index and DS=dry strength index.

The tissue paper according to the invention contains an amount of wet strength agent from 1 to 4% by weight, preferably between, 1.2 to 3% by weight.

In preferred embodiments the tissue paper before converting has a relative wet strength value (RWS) of at least 47% % and more preferably at least 50%. Preferably the relative wet strength value is up to 60%.

The tissue paper may further contain an amount of a dry strength agent. Examples of preferred dry strength agents are carboxy alkyl polysaccharides, for example carboxy alkyl cellulose.

The tissue paper should preferably have a dry strength index of at least 5 Nm/g and no more than 10 Nm/g.

A tissue paper having the above characteristics is wet strong and soft and it also has a sufficient dry strength for handling in converting operations.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples below provide more specific details of the reactions, the following general principles may here be disclosed.

WET-STRONG TISSUE PAPER

Today the only way of creating a high wet strength is by one or more of the following methods:
  adding as much wet strength resin as possible;
  using a high amount of refining energy;
  adding dry strength chemicals.

This strategy leads to a high wet strength and a high dry strength, meaning that the dry strength is only a tool for improving wet strength. The dry strength level in tissue paper therefor usually is higher then necessary, which leads to a stiff and coarse paper.

It has according to the invention been found that a soft and wet strong tissue paper having a basis weight between 10 and 50 g/m$^{2}$, a bulk between 2 and 8 cm$^3$/g and a wet strength index of at least 1 Nm/g, can be obtained by the fact that the tissue paper contains a wet strength agent in the form of a nitrogen-containing polymer having hydrophobic side-chain substituents as disclosed above and by balancing the wet strength index and dry strength index of the paper so as to provide a relative wet strength index (RWS) of at least 45%, preferably at least 47 and more preferably at least 50%. The RWS value refers to the value before converting operations, such as embossing, gluing, lamination etc., since these may effect the properties of the paper.

Wet strength agents which increase the wet strength of tissue paper without increasing the dry strength are wet strength agents as disclosed above.

The addition to tissue paper of wet strength agents in the form of the nitrogen-containing polymers having saturated or unsaturated hydrophobic side-chain substituents will cause an increase of the wet strength index of the paper, due to the formation of covalent bonds between the cellulose molecules and the nitrogen-containing polymers. This is the same mechanism as in conventional wet strength agents. The addition of conventional wet strength agents will also increase the amount of hydrogen bond sites resulting in an increased dry strength. However due to the presence of the hydrophobic side-chain substituents in the wet strength agents used in the present invention the hydrogen bond sites will decrease. Since the dry strength of paper to a high degree is dependant on the amount of hydrogen bonds, a decrease of the hydrogen bonds will also result in a decrease of the dry strength of the paper.

Thus an increase of the wet strength index of the tissue paper is obtained, without increasing the dry strength index by adding the wet strength agents in the form of the nitrogen-containing polymers having hydrophobic side-chain substituents. The hydrophobic side chains may be saturated or unsaturated. In fact a decrease of the dry strength index may even be obtained.

Evaluation of the dry strength of the tissue paper was performed according to the standard method SCAN P 44:81. The wet strength was tested according to SCAN P 58:86. The tensile strength is presented as index values or geometrical mean values of machine and cross direction according to:

$$\sqrt{MD \times CD}/\text{grammage Nm/g}$$

The tissue paper should preferably contain the wet strength agent in an amount from 1 to 4% by weight, more preferably from 1.2 to 3% by weight. These values refer to the amount of wet strength agent adhering to the fibres and measured according to the so called total nitrogen method. This method is based on flash combustion and is called Dumas Total Nitrogen Analysis. The measuring instrument used is Carlo Erba Instrument NA 1500 supplied by CE Termo Quest. A manual is supplied together with the instrument.

The wet strength agent is preferably in the form of an aqueous dispersion and may be added to an aqueous cellulosic suspension containing the papermaking cellulosic fibers. The wet strength agent may also be added to the produced, paper so as to provide a surface treatment of the paper. cellulosic fibers. The wet strength agent may also be added to the produced paper so as to provide a surface treatment of the paper.

The tissue paper should preferably have a dry strength index of at least 5 Nm/g in order to be handled in converting processes such as rolling, unrolling, cutting, embossing, lamination etc. An addition of a dry strength agent, such as a carboxy alkyl polysaccharide, for example carboxy alkyl cellulose, especially carboxy methyl cellulose (CMC), may be necessary in order to obtain a sufficient dry strength of the tissue paper. These dry strength agents are anionic and will contribute in adsorbing more of the cationic wet strength agent to the fibres. The dry strength index should preferably be no more than 10 Nm/g in order to keep the softness as high as possible.

The tissue paper may also contain further additives such as softening agents, absorption enhancing agents, fillers etc.

The following examples will further illustrate how the described invention may be performed without limiting the scope of it.

EXAMPLE 1

Reaction of a polyaminoamide (hereinafter also called PAIM) (produced from adipic acid and diethylene triamine) with a hydrophobic compound (vinylog addition); 240 g (0.60 amino-mol equivalents) PAIM (53% solution in water) and 27.3 g (0.15 mol) 2-ethylhexyl acrylate (2-EHAc): were heated for 6 h and 30 min at 80° C. Subsequently, 176 g of water was added and the solution was cooled down to room temperature. Conversion of acrylate was: 99.7%.

307 g of the above hydrophobised PAIM solution was reacted with 30 ml epichlorohydrine (ECH) at 6° C. for 6 min. Subsequently, the temperature was increased until 20° C. was reached. The temperature was then increased until 50° C. and a viscosity of 120 mPa s was reached whereupon 155 ml of water was added and the temperature was adjusted to 65° C. to let the viscosity reach 120 mPa s. The reaction was finalised by adding 11 ml of sulfuric acid (50%) adjusting the pH to 3.5.

Emulsion polymerisation: The ratio resin to styrene was 1:2.

A solution of 47 g of the above produced wet strength resin, 104 g water and 1.5 ml defoamer (10% solution in water) was purged with nitrogen. The temperature was then increased to 50° C. whereupon 0.5 g Wako VA 044 and 1 ml styrene were added to the solution. 10 min later, additional styrene was added (total amount: 25 g). After 5 h at 50° C., the temperature was increased to 70° C. at which temperature the solution was kept for an hour.

EXAMPLE 2

Reaction of Polyaminoamide (PAIM) with a 2-ethylhexylacrylate (2-EHAc) (vinylog addition): 82 g (0.20 amino-mol equivalent) PAIM (52% solution in water), 1.84 g (0.01 mol) 2-ethylhexyl acrylate (2EHAc) and 43 g of water were heated for 2 h at 80° C. Conversion of acrylate: 98.9%.

15,4 ml epichlorohydrine (ECH) was added to 125 g of the above hydrophobised PAIM solution at 6° C. for 6 min. Subsequently, the temperature was increased until 20° C. was reached. The temperature was then increased to 65° C. and a viscosity of 120 mPa s was reached whereupon 86 ml of water was added. The temperature was raised to 65° C. and kept at 65° C. until the viscosity reached 120 mPa s. The reaction was finalised by addition of 11 ml sulfuric acid (50%) adjusting the pH to 3.5.

Emulsion polymerisation:. The resin/styrene ratio was 1:0.5. A solution of 88.5 g of the above wet strength resin, 92 g water and 1.5 ml defoamer (10% solution in water) was purged with nitrogen. The temperature was increased to 45° C. 0.04 g Wako VA 044 and 2 ml styrene were added whereafter the temperature was raised to 50° C. After 10 minutes, additional styrene was added (total amount: 12 g). After 3 h at 50° C., the reaction mixture was cooled down to room temperature.

EXAMPLE 3

260 g (0.65 amino mol equivalent) PAIM (53% solution in water) (Polyaminoamide, PAIM) and 25% 41.0 g (0.16 mol) dodecyl acrylate (vinylog addition) were heated for 4 h 30 min at 80° C. Subsequently, 211 g water was added whereafter the mixture was cooled down to room temperature.

302 g of the above hydrophobised PAIM was then reacted with 30 ml (0.20 mol) epichlorohydrine (ECH) at 8° C. for 4 min. Subsequently, the temperature was increased until 20° C. was reached. The temperature was then increased until 50° C. and a viscosity of 120 mPa s was reached. 185 ml water was then added and the temperature was raised to 65° C. and kept at that temperature until the viscosity reached 120 mPa s. The reaction was finalised by addition of 10 ml sulfuric acid (50%) adjusting the pH to 3.5.

Emulsion polymerisation:. The resin/styrene ratio was 1:1. A solution of 75.0 g of the above wet strength resin, 100 ml water and 1 ml defoamer (10% solution in water) was purged with nitrogen. The temperature was increased to 50° C. whereupon 30 mg Wako VA 044 and 1 ml styrene were added. After 10 minutes additional styrene was added (total amount: 20.5 g). After 5 h at 50° C., the temperature was increased to 70° C. and set at that temperature for one hour.

EXAMPLE 4

In the emulsion polymerisation, butyl acrylate was used instead of styrene. A solution of 75.0 g of the wet strength resin of example 3 (13% solids), and 1.5 g defoamer (10% solution in water) was purged with nitrogen. The temperature was increased to 45° C. 0.03 g Wako VA 044 and 2 ml butyl acrylate were then added whereupon the temperature was increased to 50° C. After ten minutes, styrene was added (total amount: 14.2 ml). After 2 h 50 min at 50° C., the temperature was increased to 70° C. which temperature was kept for one hour.

EXAMPLE 5

25% 2-ethylhexyl acrylate was used to hydrophobise PAIM. Emulsion polymerisation: A solution of 121 g of the wet strength resin of example 1 (solids 28%), 131 a water and 1 ml defoamer (10% solution in water) was purged with nitrogen. The temperature was increased to 45° C. 0.04 g Wako VA 044 and 2 ml of a monomer mixture (styrene: 1,6-hexandiol diacrylate=0.375: 0.125) were added whereupon the temperature was raised to 50° C. in 10 min. Subsequently, the monomer mixture was added (total amount: 17 g). After 3 h at 50° C. the reaction mixture was cooled down to room temperature.

EXAMPLE 6

25% 2-ethylhexyl acrylate was used to hydrophobise PAIM. A monomer mixture of styrene with t-butyl acrylate (0.45:0.05) was used, Emulsion polymerisation: A solution of 121 g of the wet strength resin of example 1 (solids 28%), 131 g of water and 1 ml defoamer (10% solution in water) was purged with nitrogen. The temperature was increased to 45° C. 0.04 g Wako VA 044 and 2 ml of a monomer mixture (styrene: t-butyl acrylate=0.45:0.05) were then added and the temperature was raised to 50° C. in 10 min. Subsequently, the monomer mixture was added (total amount: 17.0 g). After 3 h at 50° C. the reaction mixture was cooled down to room temperature.

EXAMPLE 7

630 g (1.67 amino-mol equivalent) PAIM (56% solution in water) and 12% (0.2 mol) dodecyl acrylate (vinylog addition) were heated for 6 h at 80° C. Subsequently, 326 g water was added whereafter the mixture was cooled down to room temperature. Conversion of the acrylate was >99%.

1005 g of the above hydrophobised PAIM was then reacted with 155 g (1.68 mol) epichlorohydrine (ECH) at 8° C. for 4 min. Subsequently, the temperature was increased until 20° C. was reached. The temperature was then increased until 50° C. and a viscosity of 120 mPa s was reached 287 ml water was then added and the temperature was raised to 65° C. and kept at that temperature until the viscosity reached 100 mPa S. The reaction was finalised by addition of 50 ml sulfuric acid (50%) and 513 ml water adjusting the pH to 3.5.

EXAMPLE 8

308.5 g (0.81 amino-mol equivalent) PAIM (55% solution containing in water) and 15% (0.12 mol) benzyl chloride (alkylation reaction) were heated for 6 h at 60° C. Subsequently, the mixture was cooled down to room temperature.

125.5 g of the above hydrophobised PAIM was then reacted with 17.7 g (0.19 mol) epichlorohydrine (ECH) at 6° C. for 4 min. Subsequently, the temperature was increased until 20° C. was reached. The temperature was then increased until 50° C. and a viscosity of 120 mPa s was reached. 33 ml water was then added and the temperature was raised to 65° C. and kept at that temperature until the viscosity reached 100 mPa s. The reaction was finalised by addition of 6 ml sulfuric acid (50%) adjusting the pH to 3.5.

EXAMPLE 9

350 g (0.91 amino-mol equivalent) PAIM (55% solution in water) and 15% (0.14 mol) 2-ethylhexyl glycidyl ether (alkylation reaction) were heated for 7.5 h at 60° C. Subsequently, the mixture was cooled down to room temperature.

130.4 g of the above hydrophobised PAIM was then reacted with 17.7 g (0.19 mol) epichlorohydrine (ECH) at 6° C. for 4 min. Subsequently, the temperature was increased until 20° C. was reached. The temperature was then increased until 50° C. and a viscosity of 120 mPa s was reached. 33 ml water was then added and the temperature was raised to 65° C. and kept at that temperature until the viscosity reached 100 mPa s. The reaction was finalised by addition of 5.7 ml sulfuric acid (50%) adjusting the pH to 3.5.

EXAMPLE 10

274 g (0.71 amino-mol equivalent) PAIM (55% solution in water) and 3.8% (0.027 mol) alkyl ketene dimer (C18-chains) were heated for 6 h at 60° C. Subsequently, the mixture was cooled down to room temperature.

127.2 g of the above hydrophobised PAIM was then reacted with 17.7 g (0.19 mol) epichlorohydrine (ECH) at 6° C. for 4 min. Subsequently, the temperature was increased until 20° C. was reached. The temperature was then increased until 50° C. and a viscosity of 120 mPa s was reached. 33 ml water was then added and the temperature was raised to 65° C. and kept at that temperature until the viscosity reached 100 mPa s. The reaction was finalised by addition of 5.7 ml sulfuric acid (50%) adjusting the pH to 3.5.

EXAMPLE 11

274 g (0.71 amino-mol equivalent) PAIM (55% solution in water) and 5% (0.036 mol) alkenyl succinic anhydride (C18-chains) were heated for 6 h at 60° C. Subsequently, the mixture was cooled down to room temperature.

124.3 g of the above hydrophobised PAIM was then reacted with 17.7 g (0.19 mol) epichlorohydrine (ECH) at 6° C. for 4 min. Subsequently, the temperature was increased until 20° C. was reached. The temperature was then increased until 50° C. and a viscosity of 120 mPa s was reached. 33 ml water was then added and the temperature was raised to 65° C. and kept at that temperature until the viscosity reached 100 mPa s. The reaction was finalised by addition of 5.7 ml sulfuric acid (50%) adjusting the pH to 3.5.

EXAMPLE 12

185.4 g (0.48 amino-mol equivalent) PAIM (54% solution in water) and 10% (0.048 mol) hexanediol diacrylate (90%) were heated for 4.5 h at 80° C. Subsequently, the mixture was cooled down to room temperature. Conversion of acrylate: >99%.

124.0 g of the above hydrophobised PAIM was then reacted with 17.7 g (0.19 mol) epichlorohydrine (ECH) at 6° C. for 4 min. Subsequently, the temperature was increased until 20° C. was reached. The temperature was then increased until 50° C. and a viscosity of 120 mPa s was reached. 33 ml water was then added and the temperature was raised to 65° C. and kept at that temperature until the viscosity reached 100 mPa s. The reaction was finalised by addition of 6.7 ml sulfuric acid (50%) adjusting the pH to 3.5.

Application Testing

Paper sheets were prepared on the dynamic sheet former "Formette". The furnish consisted of 35% CTMP and 65% TCF refined to 25° SR. The paper was artificially cured 10 min at 105° C. before conditioning the paper according to DIN 5312. Tensile testing was done as described in DIN 53112. For wet tensile testing the paper was soaked 60 min at room temperature. For comparison reasons, data on paper prepared by using a conventional polyaminoamide epichlorohydrin resin has also been given. It is to be noted that the paper sheets below appearing in tables 1–4 have been tasted at three different occasions using different addition levels of the wet strength agent used. In example 1–6, 20 kg wet strength agent was added/tonne cellulosic fibres. The grammage was 55 g/m$^2$. In examples 7–12. the grammage was 30 g/m$^2$ and the addition levels of wet strength resin were 15, 20 and 30 kg/tonne cellulosic fibres. As a consequence thereof, observed values of relative strength vary between each occasion. A reference resin, i.e. a conventional resin, has therefore been measured at each occasion as appears from the tables 1–4 below. As can be seen from the examples, the wet strength resins and agents show superior effect in view of the conventional resin used as reference at the same addition levels.

Wet-strong Tissue Paper Tests

Four different wet strength agents were produced according to Example 7 above. The wet strength agents were designated A, B, C and D, of which D were produced exactly as disclosed in Example 7, while the other three were produced as disclosed but with the modification that varying amounts of dodecyl acrylate were used.

EXAMPLE 13

Tissue paper having a basis weight of about 25 g/m$^2$ and a bulk at 2 kPa of about 6–6.5 cm$^3$/g was produced on a full scale paper machine. The pulp used was a mixture of 70% by weight CTMP (chemothermomechanical pulp) and 30% by weight sulphate softwood pulp. Varying amounts of the wet strength agents A and B were added. The results obtained are presented in Table 5 below.

EXAMPLE 14

Tissue paper having a basis weight of about 26.5 g/m$^2$ and a bulk at 2 kPa of about 2.5 cm$^3$/g was produced on a full scale paper machine. The pulp used was recycled newsprint mixed. The wet strength agent D was used in combination with a dry strength agent in the form of CMC (carboxy methyl cellulose). The results obtained are presented in Table 7 below.

These tests showed that it is possible to achieve relative wet strength values (RWS) of 45% and higher by using relatively high amounts of the wet strength agents containing hydrophobic side-chain substituents. The wet strength agent may advantageously be combined with an anionic dry strength agent in order to adsorb more of the cationic wet strength agent to the fibres.

TABLE 1

| Sample | Dry tensile index in Nm/g | Wet tensile index in Nm/g | Relative wet strength in % |
|---|---|---|---|
| Conventional resin | 49 | 13 | 27 |
| Example 1 Wet Strength Emulsion | 37 | 14 | 37 |
| Example 2 Wet Strength Emulsion | 51 | 15 | 30 |
| Example 3 Wet Strength Resin | 37 | 12 | 32 |
| Example 3 Wet Strength Emulsion | 37 | 13 | 34 |
| Example 4 Wet Strength Emulsion | 33 | 12 | 36 |
| Example 5 Wet Strength Emulsion | 35 | 11 | 31 |
| Example 6 Wet Strength Emulsion | 37 | 12 | 33 |

TABLE 2

| Sample 15 kg/ton of paper | Dry tensile index in Nm/g | Wet tensile index in Nm/g | Relative wet strength in % |
|---|---|---|---|
| Conventional resin | 40.3 | 9.7 | 23.9 |

TABLE 2-continued

| Sample 15 kg/ton of paper | Dry tensile index in Nm/g | Wet tensile index in Nm/g | Relative wet strength in % |
|---|---|---|---|
| Example 7 Wet strength resin | 31.6 | 9.3 | 29.5 |
| Example 8 Wet strength resin | 38.3 | 11.0 | 28.7 |
| Example 9 Wet strength resin | 33.6 | 9.0 | 26.7 |
| Example 10 Wet strength resin | 40.3 | 10.7 | 26.6 |
| Example 11 Wet strength resin | 35.3 | 10.7 | 30.2 |
| Example 12 Wet strength resin | 38.6 | 10.3 | 26.7 |

TABLE 3

| Sample 20 kg/ton of paper | Dry tensile index in Nm/g | Wet tensile index in Nm/g | Relative wet strength in % |
|---|---|---|---|
| Conventional resin | 41.6 | 10.3 | 24.8 |
| Example 7 Wet strength resin | 31.6 | 9.3 | 29.5 |
| Example 8 Wet strength resin | 38.0 | 10.8 | 28.5 |
| Example 9 Wet strength resin | 35.0 | 10.0 | 28.6 |
| Example 10 Wet strength resin | 39.3 | 11.0 | 28.0 |
| Example 11 Wet strength resin | 35.0 | 11. | 31.4 |
| Example 12 Wet strength resin | 37.3 | 10.7 | 28.6 |

TABLE 4

| Sample 30 kg/ton of paper | Dry tensile index in Nm/g | Wet tensile index in Nm/g | Relative wet strength in % |
|---|---|---|---|
| Conventional resin | 40.0 | 10.7 | 26.7 |
| Example 7 Wet strength resin | 31.6 | 10.0 | 31.6 |
| Example 8 Wet strength resin | 39.3 | 11.7 | 29.7 |
| Example 9 Wet strength resin | 34.0 | 11.0 | 32.4 |
| Example 10 Wet strength resin | 38.3 | 11.3 | 29.6 |
| Example 11 Wet strength resin | 34.3 | 11.3 | 33.0 |

TABLE 5

| Wet strength agent | Added amount (kg/t pulp fibers) | Dry strength index (Nm/g) | Wet strength index (Nm/g) | Rel wet strength index RWS (%) |
|---|---|---|---|---|
| A | 7 | 10.2 | 3.4 | 33 |
| A | 10 | 10.1 | 4.0 | 40 |
| A | 15 | 8.7 | 3.8 | 44 |
| A | 20 | 7.9 | 4.1 | 52 |
| B | 7 | 8.4 | 3.6 | 43 |
| B | 10 | 8.8 | 3.7 | 42 |
| B | 15 | 8.3 | 4.0 | 48 |
| B | 20 | 9.0 | 4.1 | 46 |

TABLE 6

| Wet strength agent | Added amount Wet strength agent (kg/t pulp fibers) | Added amount CMC (dry strength agent) (kg/t pulp fibers) | Dry strength index (Nm/g) | Wet strength index (Nm/g) | Rel. wet strength RWS (%) |
|---|---|---|---|---|---|
| C | 16 | 3 | 12.9 | 4.7 | 33 |
| C | 18 | 3 | 13.5 | 4.8 | 31 |
| C | 25 | 3 | | | 50 |

TABLE 7

| Wet strength agent | Added amount Wet strength agent (kg/t pulp fibers) | Added amount CMC (dry strength agent) (kg/t pulp fibers) | Dry strength index (Nm/g) | Wet strength index (Nm/g) | Rel. wet strength RWS (%) |
|---|---|---|---|---|---|
| D | 20 | 2.3 | 9.3 | 4.2 | 46 |
| D | 20 | 3.3 | 8.8 | 5.0 | 57 |
| D | 15 | 2 | 8.0 | 3.8 | 48 |
| D | 15 | 3 | 10.6 | 4.1 | 39 |

What is claimed is:

1. Tissue paper having a bulk between 2 and 8 $cm^3/g$, said tissue paper containing an amount of a wet strength agent and having a wet strength index from about 1 Nm/g to about 10 Nm/g, wherein the tissue paper contains a wet strength agent in the form of a nitrogen-containing crosslinked polymer having hydrophobic side-chain substituents and before converting has a relative wet strength value (RWS) of at least 45%.

2. Tissue paper as claimed in claim 1, wherein the nitrogen containing polymer is a polyamine or a polyaminoamide.

3. Tissue paper as claimed in claim 2, wherein the hydrophobic side-chain substituents comprise a hydrophobic chain having 6–40 carbons.

4. Tissue paper as claimed in claim 1 wherein the wet strength agent is present in an amount from 0.7 to 4% by weight.

5. A tissue paper as claimed in claim 4 wherein the wet strength agent is present in an amount from 1 to 3% by weight.

6. Tissue paper as claimed in claim 1, wherein before converting the tissue paper has a relative wet strength value (RWS) of at least 47%.

7. A tissue paper as claimed in claim 6 wherein, before converting, the tissue paper has a relative wet strength value (RWS) of at least 50%.

8. Tissue paper as claimed in claim 1 wherein before converting, the tissue paper has a relative wet strength value (RWS) of up to 60%.

9. Tissue paper as claimed in claim 1 further comprising an amount of dry strength agent.

10. Tissue paper as claimed in claim 9, wherein the dry strength agent is a carboxy alkyl polysaccharide.

11. Tissue paper as claimed in claim 10, wherein the carboxy alkyl polysaccharide is a carboxy alkyl cellulose.

12. Tissue paper as claimed in claim 1 wherein the tissue paper has a dry strength index of at least 5 Nm/g.

13. Tissue paper as claimed in claim 12, wherein the tissue paper has a dry strength index of no more than 10 Nm/g.

* * * * *